United States Patent [19]

Hantke

[11] 4,063,477
[45] Dec. 20, 1977

[54] APPARATUS AND METHOD FOR CUTTING CARPET

[75] Inventor: Helmut Hantke, South Pasadena, Calif.

[73] Assignee: Apex Pattern Company, Los Angeles, Calif.

[21] Appl. No.: 716,336

[22] Filed: Aug. 20, 1976

[51] Int. Cl.² .......................... B26F 1/44; B26D 3/00
[52] U.S. Cl. .......................................... 83/40; 83/382; 83/386; 83/454; 83/925 CC
[58] Field of Search ...................... 83/40, 49, 382, 386, 83/387, 388, 390, 454, 460, 465, 637, 925 CC

[56] References Cited

U.S. PATENT DOCUMENTS

| 2,643,715 | 6/1953 | McClellan | 83/387 |
| 3,841,189 | 10/1974 | Spengler et al. | 83/925 CC X |

FOREIGN PATENT DOCUMENTS

| 1,478,845 | 3/1967 | France | 83/465 |
| 935,863 | 9/1963 | United Kingdom. | |

Primary Examiner—Willie G. Abercrombie
Attorney, Agent, or Firm—Poms, Smith, Lande & Glenny

[57] ABSTRACT

An apparatus and method for cutting a piece of pre-shaped carpet to pattern. The apparatus includes a bottom support platen, a common support having depending therefrom, a top pressing platen and vertically-cutting blades. The bottom support platen and the top pressing platen are shaped to conform to the shape of the pre-shaped carpet. The common support is moved vertically down so that the top pressing platen exerts substantial pressure on the carpet, and the common support continues to move down so that the vertically-cutting blades cut the carpet. The common support then moves up, lifting the blades up, followed by the reduction and release of the pressure on the carpet.

In a preferred embodiment of the method and apparatus, a peripheral support member and peripheral pressing member are provided to firmly hold the extreme edge of the carpet so that the section of the carpet to be cut is held taut during the cutting operation.

In another preferred embodiment, non-horizontal sections of the carpet are cut while the common support is in its fully-down position by means of a non-vertical cutting device which is rigidly attached to the common support.

7 Claims, 10 Drawing Figures

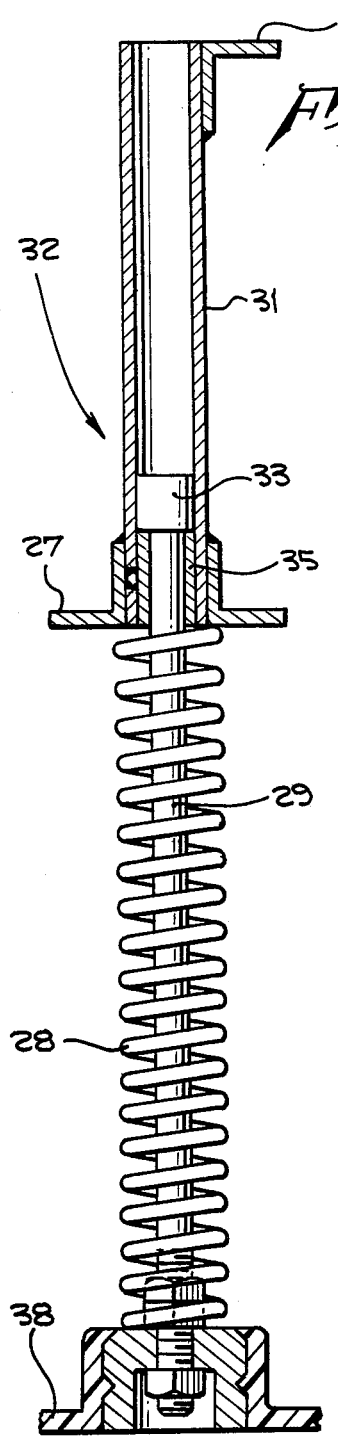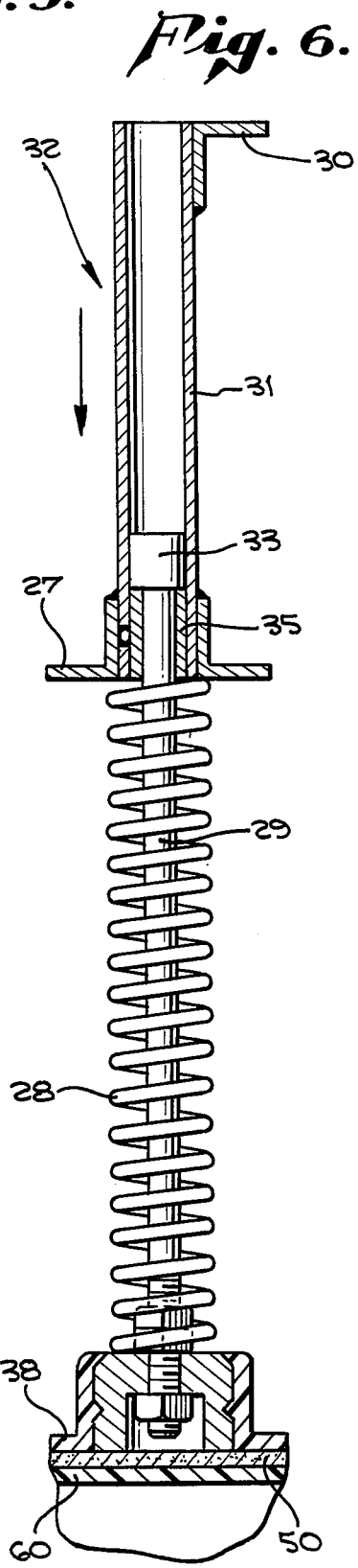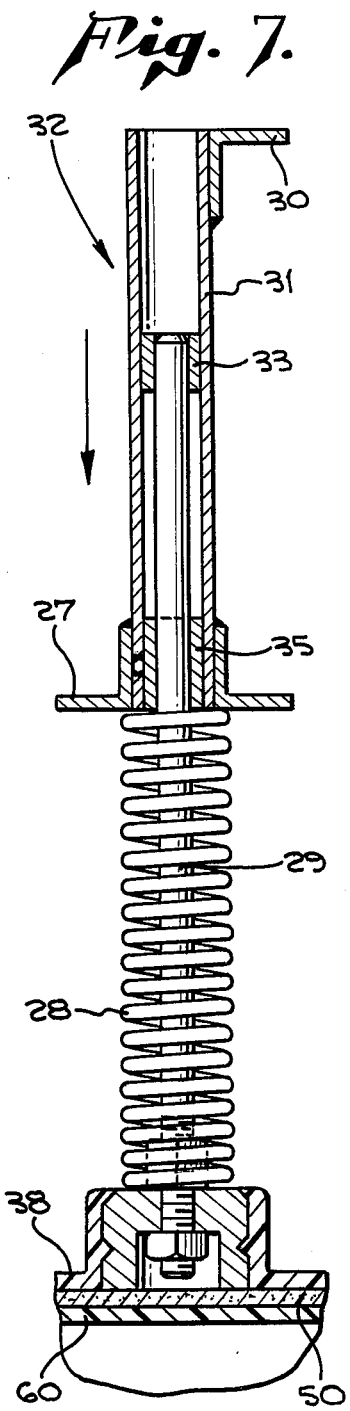

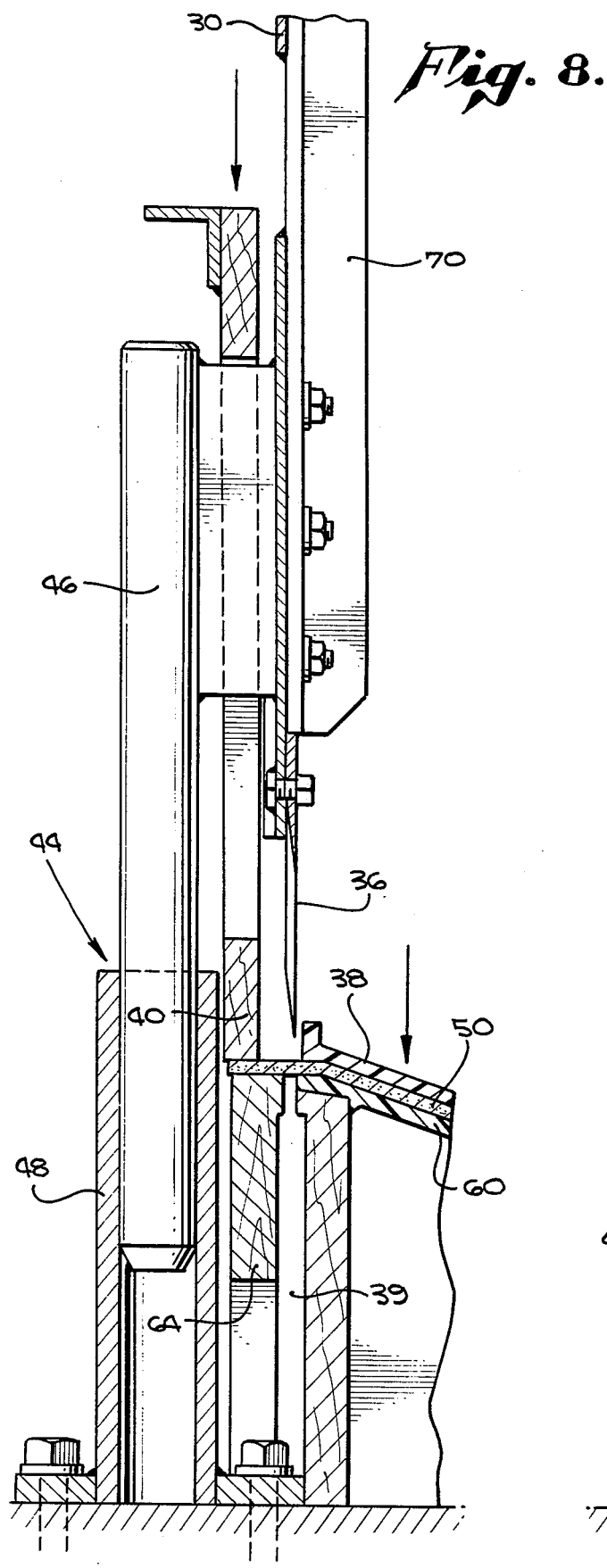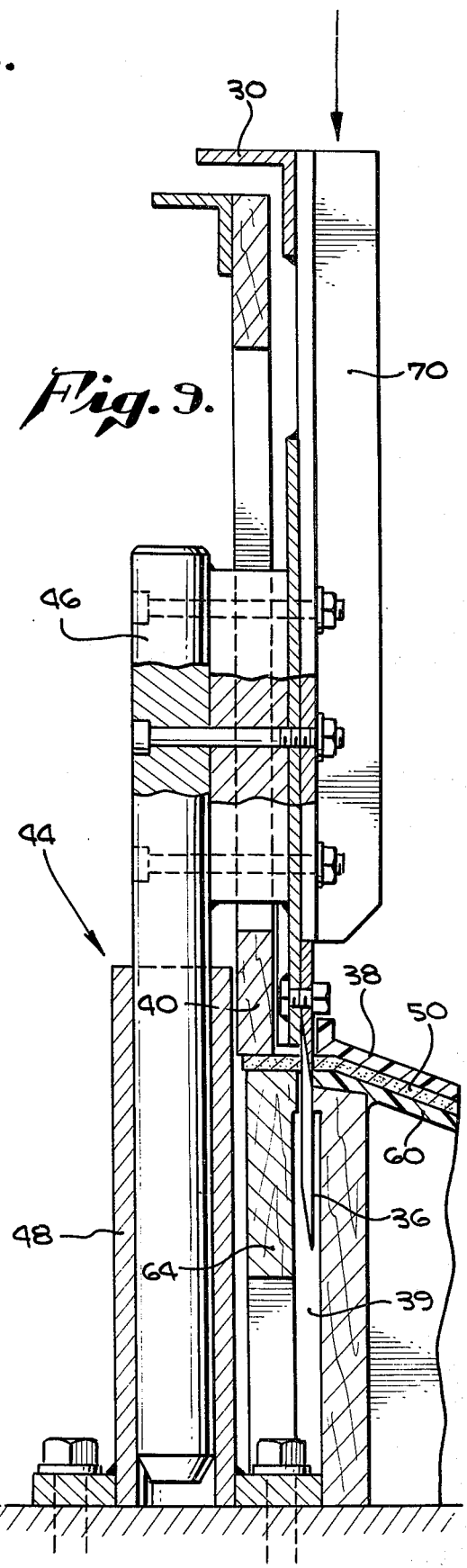

APPARATUS AND METHOD FOR CUTTING CARPET

BACKGROUND OF THE INVENTION

1. Field of the Invention

This invention relates to the field of carpet cutting, particularly to the field of pattern carpet cutting, and more particularly to the cutting of pre-shaped carpet.

2. Description of the Prior Art

There are many devices and methods available for cutting flat carpet, such as those used to cut carpet along particular pattern lines. In many of these operations, the carpet must subsequently be pressed and shaped into a specific three-dimensional shape. Because this subsequent shaping results in a distortion of the desired pattern, it has been necessary to design patterns which anticipate the subsequent shaping. However, no apparatus or method has yet been devised which will cut to pattern a pre-shaped carpet. By pre-shaped it is meant that the carpet has been formed or treated in some manner to assume a firm three-dimensional shape as opposed to being flat and limp.

SUMMARY OF THE INVENTION

Accordingly, the principal object of this invention is to provide an apparatus and method for cutting to pattern a preshaped piece of carpet.

Another object of this invention is to provide an apparatus and method which can hold a pre-shaped carpet firmly in place before the cutting step begins.

Still another object of this invention is to provide an apparatus and method which can firmly hold the pre-shaped carpet in place during and shortly subsequent to the complete cutting operation.

Yet another object of this invention is to provide an apparatus and method for cutting carpet which is able to perform the separate steps for holding the carpet in position and cutting the carpet, which separate steps result from a common downward motion.

Another object of this invention is to provide a method and apparatus which is capable of making non-vertical cuts in the non-horizontal sections of a pre-shaped carpet.

Briefly, these and other objects of the invention are provided for by an apparatus having bottom support means whose shape conforms to the shape of the carpet; common support means which supports the top pressing means and vertical cutting means therefrom and which is adapted to move down and up; drive means for moving the common support means down and up; top pressing means whose shape conforms to the shape of the carpet for exerting pressure upon the carpet, the pressure being nil when the common support means is in its fully-up position, upon contact with the carpet increasing proportionately with the downward movement of the common support means, reaching a maximum pressure when the common support means reaches its fully-down position, and decreasing to nil again as the common support means returns to its fully-up position; and vertical cutting means for vertically cutting the edges of the carpet to pattern, the cutting means being rigidly attached to the common support means and being positioned so that the cutting means does not contact the carpet as the common support means travels vertically down until the top pressing means is exerting substantial pressure upon the carpet, being positioned so that the cutting means is vertically withdrawn from contact with the carpet before the substantial pressure has been removed by the top pressing means, whereby the carpet is held firmly in position during the complete cutting operation.

In a preferred embodiment of this apparatus, there is further provided a peripheral support means for supporting the outer edges of the carpet, the peripheral support means being positioned at a lateral distance from the bottom support means to define a cutting means reception slot between them to receive the cutting means as it penetrates into and cuts the carpet lying across the reception slot; and a peripheral pressing means for exerting pressure upon the edge of the carpet resting upon the peripheral support means, the peripheral means operating in unison with the top pressing means, whereby the carpet is held tautly in place for ease and effectiveness in cutting.

Another preferred embodiment of this apparatus further includes non-vertical cutting means for cutting into non-horizontal sections of carpet, the non-vertical cutting means being attached to the common support means and being positioned perpendicular to the section of carpet to be cut, and said cutting means cutting the carpet only while the common support means is in its fullydown position.

The method of this invention briefly comprises the steps of positioning a piece of carpet upon a bottom platen so that the edges of the carpet extend over the edge of the bottom platen; supporting the piece of carpet by the bottom platen, the bottom platen having a top surface which conforms to the shape of the bottom of the carpet and whose perimeter conforms to the desired pattern of the carpet; then exerting and continuing to exert pressure upon the carpet by means of a top pressing platen whose bottom surface conforms to the top surface of the carpet; then cutting the edges of the carpet to pattern while the carpet is having pressure exerted upon it; and then releasing the pressure and removing the carpet.

In a preferred method of this invention, there are included the additional steps of separately supporting the outer edges of the carpet from the bottom of the carpet, and then pressing down on the outer edges of the carpet so as to hold the outer edge of the carpet firmly in position. This pressing is conducted simultaneously with the pressing of the main section of the carpet, and allows the cutting of the carpet between the main section of the carpet and the outer edges of the carpet.

In an alternative embodiment of the method of this invention, there is included the step of cutting into the nonhorizontal sections of the carpet by means of a cutting device which operates only when the vertical cutting device has fully penetrated the carpet and is in its full-down position.

BRIEF DESCRIPTION OF THE DRAWINGS

The above-stated and other objects and features of the apparatus and method of this invention will be better understood from the following detailed description thereof when read in light of the drawings, wherein:

FIG. 5 is a fragmentary, side-elevational view of the top pressing platen, its spring mechanism, and its upper support member, all in the non-activated, fully-up position; the view being taken along the line V—V of FIG. 4;

FIG. 6 is a similar fragmentary, side-elevational view of the device shown in FIG. 5, wherein the top pressing platen has been activated and has just contacted the carpet;

FIG. 7 is an additional view of the device shown in FIGS. 5 and 6, wherein the top pressing platen is in its fully-down position;

FIG. 8 is a fragmentary, side, cross-sectional view of the composite pressing, cutting, and aligning mechanism of the invention shown just before the cutting of the carpet begins, taken along the line VIII—VIII of FIG. 4;

FIG. 9 is a view similar to that of FIG. 8, wherein the cutting blade is in its fully-down position.

DETAILED DESCRIPTION OF THE INVENTION

Figure 1:
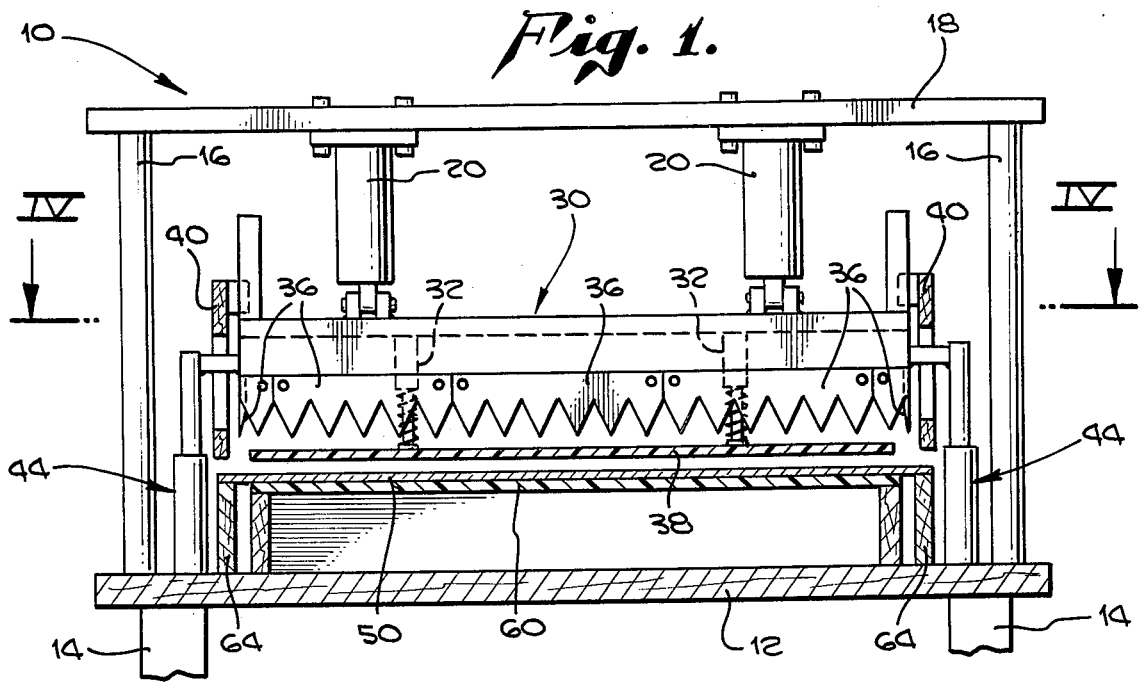
FIG. 1 is a front-elevational view, in partial cross section, of a preferred apparatus of this invention.

Referring now to FIG. 1, there is shown an elevational, cross-sectional view of a preferred carpet cutting machine 10, which is exemplary of the invention. Horizontal base foundation 12 is supported by leg supports 14 which rest on the floor, not shown; and foundation 12 supports, among other things, vertical side supports 16. Vertical side supports 16 have attached thereto, and support overhead support 18, from which are attached power drive cylinders 20. Any number and type of power drive cylinders may be employed; the apparatus shown in FIG. 1 having four air cylinders, the unseen two being located behind the two shown. Depending from the power drive cylinders 20 is common support means 30 from which depend the cutting and pressing means.

The cutting means and pressing means comprises hanging one-way bias supports 32, cutting members 36, top pressing platen 38, peripheral press member 40, and cutting alignment means 44. Carpet 50 rests upon the bottom support platen 60 and the peripheral support member 64.

Figure 2:
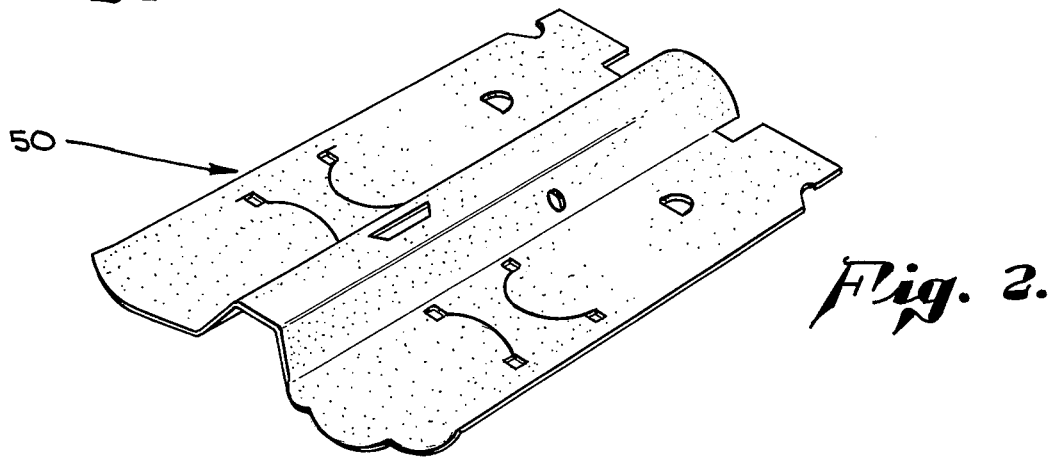
FIG. 2 is a perspective view of a pre-shaped carpet, after having been cut by the method and apparatus of this invention.

The carpet 50 is more descriptively shown in FIG. 2, which shows in perspective a completed, cut carpet. The carpet 50, before being cut, has been pre-shaped to be provided with a longitudinally-extending hump, designed to form-fit the transmission hump found in most automobiles. While the carpet may be provided with any other desired pre-shaped form, the carpet may also be flat; however this invention is particularly suited to cut carpet having a pre-shaped form. The carpet is preferably grossly cut around its periphery in order to provide a manageable piece of carpet to cut. While the cut carpet 50 shown in FIG. 2 has a particular configuration including openings and slits, any other peripheral configuration and combination of openings and slits may be provided for merely by the positioning of the cutting members 36. The carpet 50 of FIG. 2 is to be placed on the floor of an automobile body compartment, with the slits and openings provided to accommodate the attaching of seats, and seat belts, among other things.

Figure 3:
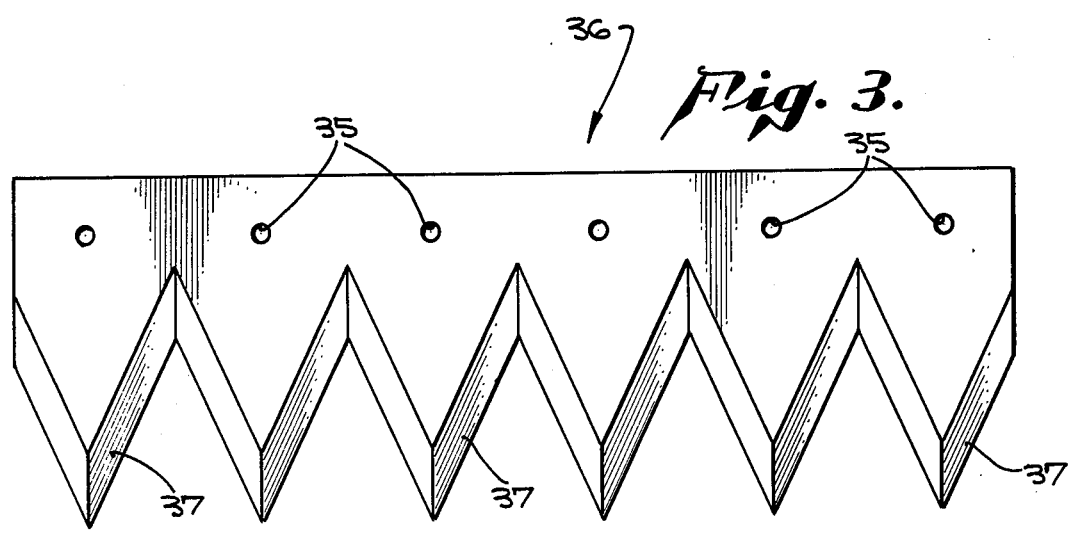
FIG. 3 is a front view of a section of an exemplary blade which can be used in the practice of the invention.

FIG. 3 illustrates an exemplary blade to be used with the cutting means of the machine. The blade 36 has a saw-toothed edge with chamfered edges 37, and attachment holes 35 for rigidly attaching the blade to the common support means 30.

Figure 4:
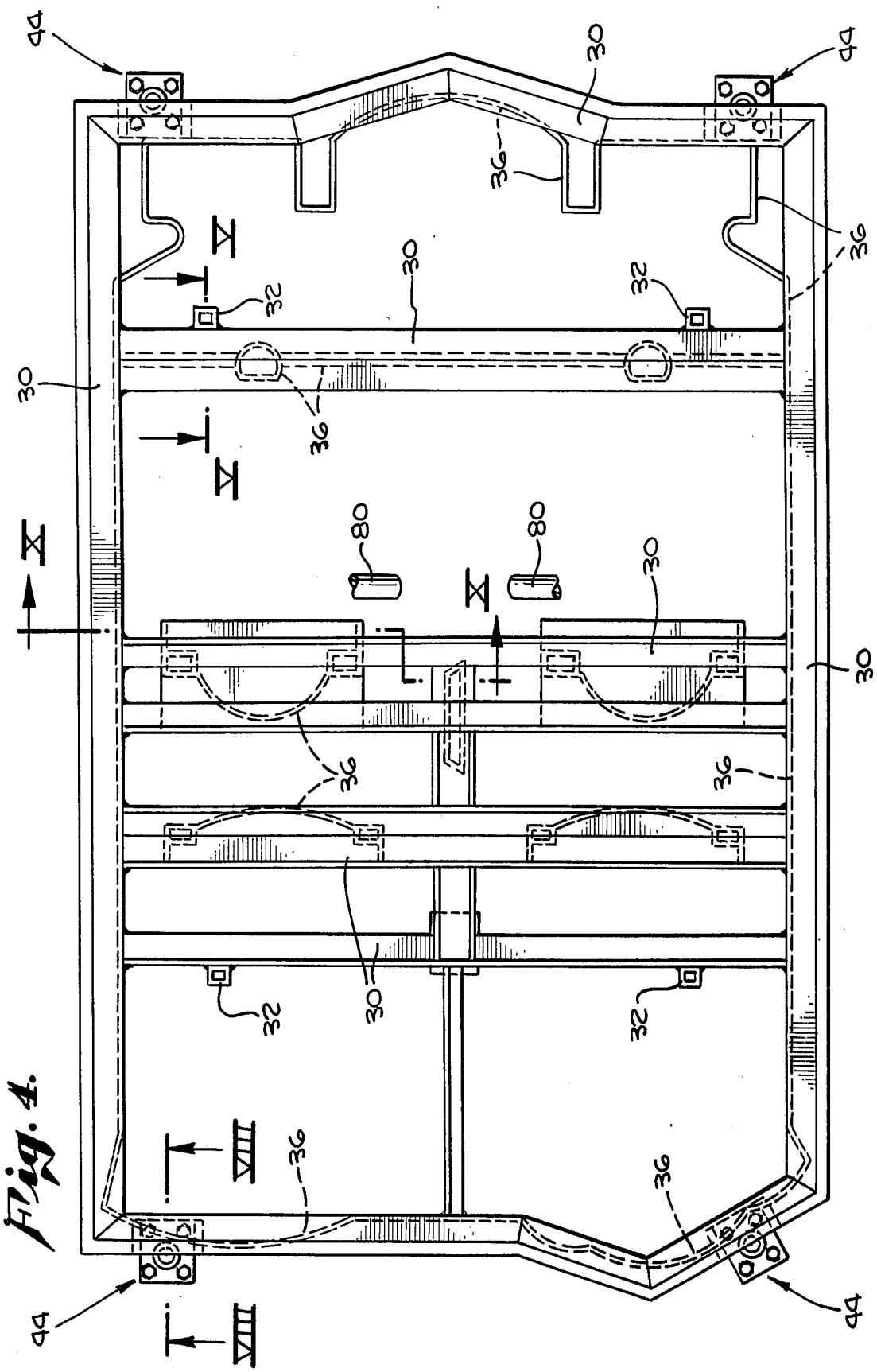
FIG. 4 is a top view of the apparatus of this invention taken along the line IV—IV of FIG. 1.

FIG. 4 is a top plan view of the machine of FIG. 1 taken along the line IV—IV. The double solid and double dotted lines represent the vertical cutting blade 36 in the configuration adapted to produce the cut carpet as shown in FIG. 2. There is also shown the common support means 30 from which the pressing means and cutting means depend, and a partial illustration of nonvertical cutting means 80.

The operation of the apparatus will now be discussed with reference to FIGS. 5, 6, 7, 8, and 9, as well as FIG. 1. The operation is initiated by activating the power drive cylinders 20 which drive the common support means 30 in a vertically-down direction. Attached to the common support means 30 are the hanging one-way bias supports 32, of which the device shown in FIG. 5 is exemplary. The support means 32 of FIG. 5 comprises a piston cylinder 31, piston 33, piston rod 29, and piston-rod spring 28. Attached at the bottom of the piston rod is the top pressing platen 38, shown in fragmentary section. Also shown in fragmentary section is the carpet 50 resting on the bottom support platen 60.

The hanging one-way support 32 in FIG. 5 is shown in its non-activated position, with the piston 33 resting on piston stop 35 on the inside of the cylinder wall. There are four such supports 32 depending from the common support means 30. While more or fewer such supports may be used, four supports 32 should provide the necessary balance and support for the top pressing platen 38 depending therefrom.

The operation is initiated by activating the power drive cylinders 20, which drive the common support means 30 downwardly, thereby causing the hanging supports 32 to also move down. FIG. 6 shows the top pressing platen 38 as it just makes contact with the carpet 50. As can be seen, the piston and piston rod are still in their resting position relative to the piston cylinder. FIG. 8 to be described in more detail hereafter, also shows the top pressing platen 38 as it just comes in contact with the carpet 50.

The power drive cylinders 20 continue to force the common support means down, as shown in FIG. 7. Because the top pressing platen has reached the carpet and can not travel down any further, the piston 33 and the piston rod 29 move up relative to the piston cylinder 31. As the piston cylinder continues to move down, the piston-rod spring 28 which envelopes the piston rod and is restricted between the piston cylinder flange 27 and the top pressing platen 38, is compressed and results in an increasing pressure on the carpet 50.

As shown in FIG. 9, the further downward movement of the common support means 30, in addition to increasing the pressure that the top pressing platen exerts on the carpet 50, drives the vertical cutting blades 36 down and through the carpet 50.

After the power drive cylinders have driven the common support means 30 down to its fully-down position and the cutting of the carpet has been completed, the power drive cylinders lift the common support means 30 to its original fully-up position. This sequence of steps is the reverse of the downward, pressing and cutting operation. As the common support means 30 moves up, the vertical cutting blades 36 and the piston cylinder 31 move upwardly at an equal rate. During this initial upward movement, the top pressing platen 38 remains in contact with the carpet 50, while the pressure exerts, steadily decreases. As the common support means 30 continues to move upwardly, the vertical cutting blades 36 move up and above the carpet 50, after which the piston stops 35 within the piston cylinders 31 engage the pistons 33 and thereby lift the top pressing platen 38 off and away from the carpet 50.

Now referring to FIGS. 8 and 9 in particular, which are taken along the lines VIII—VIII of FIG. 4, there is shown common support means 30 having attached to it a vertical blade brace 70. The vertical cutting blades 36 are integrally attached to the vertical blade brace 70 so as to move downwardly and upwardly directly with the common support means 30.

Also shown is the peripheral press member 40 which, in conjunction with peripheral support member 64, holds carpet 50 taut during the cutting operation to thereby allow a clean, smooth, and effective cut. The peripheral support member 64 and the peripheral press member 40 are positioned a short lateral distance away from the bottom support platen 60 and the top pressing platen 38. This positioning defines a vertical cutting blade reception slot 39. Slot 39 extends around the perimeter of the carpet and defines the pattern desired for the carpet, and is situated directly beneath the section or line of the carpet 50 which is to be cut. Peripheral press member 40, peripheral support member 64, top pressing platen 50, and bottom support platen 60 cooperate in holding carpet 50 taut during the cutting operation. Similar vertical cutting blade reception slots, such as slots 39, are provided within the boundary of the bottom support platen 60. These inner slots, rather than being defined by the spacing between the peripheral support member 64 and the bottom support platen 60, are defined merely by the provision of a discontinuity or slot in the bottom support platen 60. The openings in the carpet 50, as shown in FIG. 2, are produced by arranging the cutting blades 36 in a closed pattern so as to remove an entire section of carpet. The peripheral press member 40 functions in a manner identical to the top pressing member 38. The peripheral press member 40 is indirectly attached to the common support means 30 via a spring and piston means similar to that used with the top pressing platen 38. This allows the peripheral press member 40 to engage the carpet 50 before the vertical cutting blades 36 begin to cut the carpet, and to apply the appropriate pressure to the carpet during the complete cutting operation.

It is preferred in the design and operation of this apparatus that the vertical cutting blades 36 and the edge of the bottom support platen 60 or the edge of the peripheral support member 64 engage each other in a scissor-like fashion during the cutting operation. By providing that the vertical cutting blade 36 slideably engage the edge of the bottom support platen 60, a clean cut edge on the carpet 50 is produced.

Because the carpet is usually thick and stiff, there is a tendency for the normally thin blade to waver from its vertical alignment. To assist in maintaining the alignment of the cutting members during the cutting operation an alignment means 44 is provided which consists of a sliding alignment rod 46 integrally attached to the vertical blade brace 70 and to the cutting member 36, and an alignment cylinder 48, which slideably receives the alignment rod 46 as the cutting member 36 travels up and down during the cutting operations. Because the alignment cylinder 48 is firmly attached to the foundation of the machine, it maintains the proper vertical alignment of the cutting members 36 throughout the cutting operations. Several of these cutting alignment means may be positioned around the peripheral of the machine where necessary.

Because it may be desirable in some applications to make a non-vertical cut in a pre-shaped carpet which would not allow the use of cutting members attached to the vertically-moving common support means 30, it is necessary to provide a non-vertical cutting means whose cutting members are not activated until the top pressing platen is firmly in place and all vertical motion has stopped. Such a cutting operation would be required, for example, to make any cuts, holes, or slits in the shaped portion of the carpet 50 which fits over the transmission hump.

Figure 10:
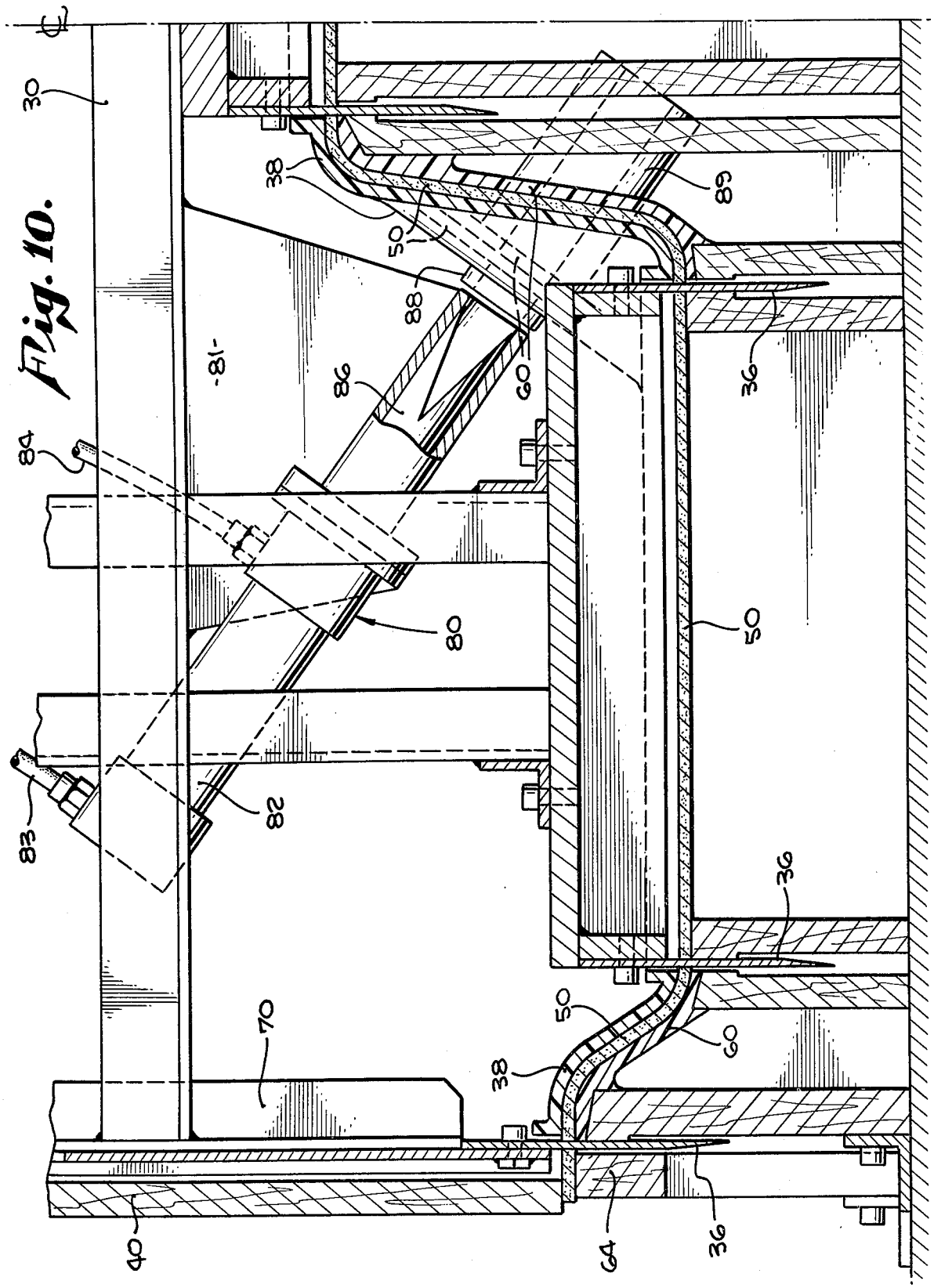
FIG. 10 is an elevational, cross-sectional view of the apparatus taken along the line X—X of FIG. 4, and shows a nonvertical cutting mechanism.

In FIG. 10, non-vertical cutting means 80 is comprised of hydraulic cylinder 82, non-vertical cutting member 86, and top pressing platen cutting flange 88. The non-vertical cutting means 80 is integrally attached to the common support means 30 by means of brace support 81. Because this non-vertical means 80 will be used to cut a hole in this embodiment, the top pressing platen 38 and the bottom support platen 60 will have appropriately sized openings to receive the cutting member 86. Cutting member 86 is a circular blade; however, any desired shape may be employed. The top pressing platen 38 is provided with an integral flange 88 which rises above the perimeter of the opening and functions as a guide for the cutting member as it approaches the carpet. On the bottom support platen 60 there is also provided a cutting flange 89 which extends into a cylinder to receive the cut-away portions of the carpet 50 and to provide safety protection to the operators of the machine by shielding the cutting member 86 when it is fully extended. The bottom support platen cutting flange 89 also serves as a cutting edge to provide a scissors-like action, by having the cutting member 86 slideably engage its inner surface.

The operation of the non-vertical cutting means begins when the common support means 30, to which it is attached, has reached its fully-down position, which coincides with the time that the top pressing platen 38 is applying its greatest pressure to the carpet 50. The non-vertical cutting member 86 is driven by activating forward hydraulic line 83, resulting in the cutting member 86 cutting and passing through carpet 50. When the cutting step is completed, return hydraulic line 84 is activated which lifts the cutting member 86 into its up, non-extended position, ready for the cutting of a new piece of carpet. It must be emphasized that this non-vertical cutting operation can only take place while the top pressing platen is fully-down and pressing the carpet 50.

The method and apparatus of this invention have been described with reference to the particular and preferred embodiment shown in the drawing; however it must be remembered that many obvious alterations and modifications may be made in the method and apparatus described.

The apparatus and method invented are particularly pointed out and distinctly claimed in the following claims, wherein I claim:

1. In an apparatus for cutting a carpet or the like to pattern, having bottom support means, top pressing means, and cutting means, wherein the improvement comprises:

said bottom support means being adapted for supporting a pre-shaped carpet which is to be cut along pattern lines which extend in both the vertical and horizontal directions, said bottom support means having a top surface whose edges conform to the pattern lines of the carpet and whose top surface shape conforms to the shape of the bottom of the carpet;

said top pressing means being adapted for exerting pressure upon the top of the pre-shaped carpet during the cutting operation, said means having a bottom surface whose shape conforms to the shape of the top of the carpet; and said cutting means having a cutting edge which is adapted for initially piercing the carpet at a plurality of spaced points along the pattern lines and which cutting edge will progressively cut the carpet from each pierced point along both directions of the pattern line until the carpet is cut.

2. The apparatus defined in claim 1 wherein the improvement further comprises:

second cutting means for cutting into non-horizontal sections of said carpet with a cutting stroke which is substantially perpendicular to the section of the carpet to be cut.

3. The apparatus defined in claim 1 wherein the cutting means comprises:

a cutting edge having pointed saw-teeth.

4. The apparatus defined in claim 1 wherein:

said cutting means is adapted to have its cutting edge slideably engage the edges of the bottom support means so as to cut the carpet in a scissors-like manner.

5. In a method for cutting a pre-shaped workpiece to pattern along pattern lines which extend in both the vertical and horizontal directions comprising:

supporting said workpiece upon a bottom support member having a top surface whose edges conform to the pattern lines and whose top surface shape conforms to the shape of the bottom of the workpiece;

applying pressure to the top of the workpiece with a top pressing member having a bottom surface whose shape conforms to the shape of the top of the workpiece; then piercing the workpiece at a plurality of spaced points along the pattern lines; and cutting said workpiece to pattern by progressively cutting said workpiece from each point of piercing in both directions along the pattern line until the workpiece is cut.

6. The method defined in claim 5 further including the step of cutting non-horizontal sections of the workpiece comprising:

piercing the workpiece at a plurality of spaced points along the pattern lines desired for said non-horizontal sections; and cutting said non-horizontal sections of said workpiece to pattern with a cutting stroke which is substantially perpendicular to the section to be cut by progressively cutting said workpiece from each point of piercing in both directions along the pattern line until said non-horizontal section is cut.

7. The method defined in claim 5 wherein the step of cutting said workpiece comprises cutting said workpiece in a scissors-like manner.

* * * * *